United States Patent
Kline et al.

(10) Patent No.: US 8,029,036 B2
(45) Date of Patent: Oct. 4, 2011

(54) APPARATUS FOR LIFTING PIPELINES

(75) Inventors: Shlomo Kline, Herzliya (IL); Mark Sela, Lehavim (IL)

(73) Assignee: Kal-Sal Works Ltd., Beer-Sheva (IL)

( * ) Notice: Subject to any disclaimer, the term of this patent is extended or adjusted under 35 U.S.C. 154(b) by 475 days.

(21) Appl. No.: 12/278,540

(22) PCT Filed: Feb. 12, 2007

(86) PCT No.: PCT/IL2007/000191
§ 371 (c)(1),
(2), (4) Date: Dec. 28, 2008

(87) PCT Pub. No.: WO2007/093986
PCT Pub. Date: Aug. 23, 2007

(65) Prior Publication Data
US 2009/0297317 A1    Dec. 3, 2009

(30) Foreign Application Priority Data
Feb. 13, 2006 (IL) .......................................... 173710

(51) Int. Cl.
*B66C 1/42* (2006.01)
*F16L 1/06* (2006.01)
(52) U.S. Cl. .................. 294/67.31; 254/93 R; 414/745.4
(58) Field of Classification Search ............... 294/67.31, 294/67.4, 67.5, 81.55, 113; 254/29 R, 30, 254/93 R; 405/184.4; 414/745.4, 746.7
See application file for complete search history.

(56) References Cited

U.S. PATENT DOCUMENTS

| | | | | |
|---|---|---|---|---|
| 2,617,678 A | * | 11/1952 | Kelso | 294/115 |
| 3,207,326 A | * | 9/1965 | Enix | 29/237 |
| 3,451,711 A | * | 6/1969 | Carpenter | 294/113 |
| 3,561,615 A | * | 2/1971 | Forsberg et al. | 29/237 |
| 4,218,044 A | | 8/1980 | Ikhsanov et al. | |
| 4,284,385 A | * | 8/1981 | Lively et al. | 29/237 |
| 5,048,793 A | * | 9/1991 | Mefford et al. | 254/29 R |

FOREIGN PATENT DOCUMENTS

| | | |
|---|---|---|
| DE | 29 18 382 | 11/1980 |
| WO | WO 01/90623 A2 | 11/2001 |

\* cited by examiner

*Primary Examiner* — Dean Kramer
(74) *Attorney, Agent, or Firm* — Merchant & Gould P.C.

(57) ABSTRACT

Apparatus for the lifting of pipelines, includes a frame having two vertical side beams and a transverse top beam interposed between the vertical beams. Two concave and symmetrically disposed supporting members pivotally connect to the two vertical beams, respectively, and are configured to achieve a pipe supporting position without applying a radial inwardly directed force to the bottommost portion of the pipe when the frame is suitably lowered and the supporting members are suitably pivoted. A driving unit is disposed within, and fixedly attached to, each of the supporting members, for generating a linear downwardly directed force; a force transmitting element connected to a driving unit rod along which a corresponding driving unit housing is slidingly displaceable. A control unit independently controls each of the driving units; and at least one connector releasably connects the two supporting members to one another when the supporting members are in a pipe supporting position. The control unit is adapted to immobilize the force transmitting elements against a trench bed in a pre-lifting mode when a first force is generated by the driving units, and to lift each of the driving unit housings together with the corresponding supporting member with respect to the corresponding force transmitting element in a lifting mode when a suitable second force greater than the first force is generated by each of the driving units.

22 Claims, 7 Drawing Sheets

APPARATUS FOR LIFTING PIPELINES

This application is a National Stage Application of PCT/IL2007/000191, filed 12 Feb. 2007, which claims benefit of Serial No. 173710, filed 13 Feb. 2006 in Israel and which applications are incorporated herein by reference and a claim of priority is made.

FIELD OF THE INVENTION

The present invention relates to an apparatus for the lifting of oil pipelines.

BACKGROUND OF THE INVENTION

Pipelines used to transport products such as oil require periodic maintenance which involves cleaning their outer surfaces and providing them with protective coating, e.g., coating for protecting the outer surfaces of the pipes from corrosion.

Currently, each pipeline section is exposed by digging at the sides and under the pipeline, to distance the outer surfaces of the pipes from the surrounding ground sufficiently to permit to carry out on said outer surfaces the required maintenance operations. In many cases, the pipeline is laid in or crosses hard ground, such as rock formations, which is very difficult to dig out, and requires lengthy and expensive operations. It will be appreciated that while the ground may have been comminuted to some extent on the sides, when a trench was dug for the laying of the pipeline, the bottom of the trench is intact and can be formed by a hard rock mass. In addition, digging underneath the pipeline in any ground type will compromise the integrity of the trench bed and additional costs are incurred in restoring the trench bed to a state suitable for supporting the pipeline.

It will be appreciated that any damage to a pipeline, involving failure thereof and spillage of the transported liquid, would constitute, apart from the economical damages, a major economical disaster, and therefore those responsible will never carry into practice a maintenance method that involves even a very small probability of such damage and failure.

WO 01/90623 attempts to overcome the above-mentioned difficulties by disclosing an apparatus which comprises a lifting frame having four telescopic legs and a transverse top beam, telescopic lifting arms supported in the top beam, chains connected to the lifting arms for engaging the bottom of the pipeline, a first hydraulic means for telescopically extending and retracting the legs of the lifting frame and a second hydraulic means for telescopically extending and retracting the lifting arms. However, several difficulties arise when utilizing the apparatus of WO 01/90623. Firstly, the chains that pass underneath and engage the pipe consist of a multiplicity of links that are usually not evenly arranged along the extent of the chain. Thus, a non-continuous distribution of weight occurs, such that some points in the chain may be required to endure a substantially greater amount of pressure than others. Additionally, some links may be arranged such that their narrow end juts into the pipe, thereby causing a risk of external damage to the pipe, and, in some cases, even puncturing of the pipe. Furthermore, the chain disclosed in WO 01/90623 must be strong, and therefore, is very heavy. As this chain is not adapted to be lifted by human effort, a heavy chain is not desirable. Finally, due to the structure of the apparatus of WO 01/90623, at least four separate acts of digging, are required in order to put the chains in place to lift one pipe section. This is excessive in view of the above-mentioned problems involved in digging at the bottom of a pipeline trench.

It is therefore an object of the present invention to provide a lifting apparatus for oil pipelines that does not suffer a risk of compromising the structural integrity of the pipeline as it is being lifted.

It is another an object of the present invention to provide a lifting apparatus that overcomes the problems associated with the prior art.

It is another an object of the present invention to provide a lifting apparatus which is positionable by human assistance without excessive difficulty.

It is another object of the present invention to provide a lifting apparatus that supports the weight of a pipe in a continuously distributed manner.

It is another object of the present invention to provide a lifting apparatus which involves considerable savings in terms of time and costs in the maintenance of pipelines with respect to a prior art apparatus.

It is another object of the present invention to provide a lifting apparatus that can be easily operated by unskilled workers.

Other purposes and advantages of the invention will appear as the description proceeds.

SUMMARY OF THE INVENTION

The present invention is directed to apparatus which is suitable for the lifting of pipelines that are embedded in subterranean regions. The pipelines, which are used to transport products such as feel, gas and hazardous liquids, require periodic maintenance which involves cleaning their outer surfaces and providing them with protective coating, e.g., coating for protecting the outer surfaces of the pipes from corrosion. Since these pipelines may reach thousands of kilometers in length, the maintenance is effected in stages. Each maintenance stage is effected on a successive pipe section which has a length in the order of tens of meters.

Prior to performing a maintenance operation, the ground underneath and to the sides of a pipe section is removed. The lifting apparatus of the invention is initially positioned above one end of a selected pipe section. Two suitable symmetric supporting members are lowered in a lowering mode and pivoted about the pipe section until they achieve a pipe supporting position. As referred to herein, a "pipe supporting position" is defined as a disposition whereat a pipe supporting surface of each supporting member is concentric to the pipe and is sufficiently close to the periphery of the pipe to apply an inwardly directed radial force thereto. The terrain underlying the lifting apparatus is then compressed in a pre-lifting mode to a sufficient hardness so as to be able to apply a suitable reactive force to a force transmitting element of the lifting apparatus. During the subsequent lifting mode, an upwardly directed reactant force is applied in response to a downwardly directed driving force and the reactive force of the compressed terrain, so that the pipe section is lifted. Following performance of the maintenance operation, the procedure is reversed until the pipe section is returned to the ground.

The lifting apparatus comprises:
a. A frame having two vertical side beams and a transverse top beam interposed between said vertical beams;
b. two concave and symmetrically disposed supporting members pivotally connected to said two vertical beams, respectively, and configured to achieve a pipe supporting position without applying a radial inwardly directed force to the bottommost portion of said pipe when said frame is suitably lowered and said supporting members are suitably pivoted;

c. a driving unit disposed within, and fixedly attached to, each of said supporting members, for generating a linear downwardly directed force;

d. a force transmitting element connected to a driving unit rod along which a corresponding driving unit housing is slidingly displaceable;

e. a control unit for independently controlling each of said driving units; and f. at least one connecting means for releasably connecting said two supporting members to one another when said supporting members are in a pipe supporting position, wherein said control unit is adapted to immobilize said force transmitting elements against a trench bed in a pre-lifting mode when a first force is generated by said driving units, and to lift each of said driving unit housings together with the corresponding supporting member with respect to the corresponding force transmitting element in a lifting mode when a suitable second force greater than said first force is generated by each of said driving units.

Each supporting member preferably comprises two identical, spaced plates having an inner edge, a pipe supporting surface having an essentially similar profile as, and extending between the corresponding inner edge of, said plates, and an outer plate.

Each plate is preferably formed with a planar outer edge, an inner edge having an upper planar portion substantially parallel to said outer edge, and a lower concave portion tangential to said upper planar portion by which the pipe is supported. The concave portion subtending an angle of approximately 65 to 75 degrees has a radius of curvature essentially equal to that of the pipe, a continuous semicircle being traced by the concave portion of each of the two supporting members being in a pipe supporting position.

In one embodiment of the invention, each plate is further formed with a wheel guard. A guide wheel is mounted within two opposed wheel guards of the two plates, respectively, of a corresponding supporting member. The two supporting members are pivotable during the lowering mode once the two guide wheels contact a pipe periphery, on opposite sides of the pipe vertical centerline, and are therefore self-positioning. The guide wheels are in continuous rolling contact with a pipe periphery from an initial contact point to a pipe supporting position, such that the supporting members are outwardly pivotable until the horizontal centerline of the pipe and are inwardly pivotable from the horizontal centerline of the pipe until the pipe supporting position.

Each plate is further formed with a lower edge of varying shape, a straight lower edge, and an upper edge. The lower edge of varying shape is preferably V-shaped to accommodate pins of the connecting means, said V-shaped lower edge being interposed between said wheel guard and the straight lower edge, said straight lower edge extending from, and being substantially perpendicular to, the outer edge.

The upper edge is preferably oblique with respect to the outer edge and the upper planar portion of the inner edge, a pivot connecting a supporting member and a corresponding vertical beam being engaged by an aperture formed in each plate in the vicinity of the upper edge.

In one embodiment of the invention, the control unit comprises means for determining that terrain underlying the force transmitting elements is sufficiently compressed during the pre-lifting mode to allow commencement of the lifting mode.

The terrain compression determining means comprises:
a. a controller;

b. an actuator for each driving unit in communication with said controller by which the magnitude of the first and second forces generated by the corresponding driving unit is determinable; and c. a sensor in communication with said controller for detecting the axial displacement of each force transmitting element with respect to the corresponding driving unit housing, said controller being adapted to determine that terrain underlying a force transmitting element is essentially completely compressed when the corresponding axial displacement sensor detects substantially no axial displacement of the corresponding force transmitting element during generation of the first force by the corresponding driving unit.

The controller is preferably adapted to transmit a command to an actuator to terminate operation of the corresponding driving unit when the terrain underlying the corresponding force transmitting element is essentially compressed and to transmit a command to the actuator of each driving unit to generate the second force which is sufficient to produce an upwardly directed reactant force applied to the corresponding driving unit housing when the terrain underlying both force transmitting elements is essentially compressed, the two driving unit housings thereby being vertically lifted at the same rate.

In one aspect, the control unit further comprises one or more orientation sensors in communication with the controller, for determining whether the lifting apparatus is balanced.

In one aspect, each driving unit is a hydraulic system by which hydraulic fluid for actuating a piston displaceable within a cylinder housed within a corresponding supporting member is supplied during the pre-lifting and lifting modes.

In one aspect, the pipe supporting surface is covered by an intermediate layer of padding.

In one aspect, each vertical beam has a horizontal rod with which a tension supporting member extending to a link displaceable by means of a crane is engaged.

DETAILED DESCRIPTION OF PREFERRED EMBODIMENTS

The present invention is a lifting apparatus for a pipeline having two separate pivotable members that support the pipeline (a portion of which is referred hereinafter as a "pipe") as the latter is being lifted without applying a force to the bottommost portion of the pipe. A force being applied by a supporting member to a pipe has been a cause in prior art lifting apparatus for damaging the periphery of the pipe, and therefore the lifting apparatus of the present invention is advantageous in that economic and ecological damage as a result of a puncturing of a pipe can be avoided.

The lifting apparatus of the present invention is operable in three modes: (a) in a lowering mode whereby the supporting members pivot as the lifting apparatus is lowered until they achieve a pipe supporting position substantially in contact with the pipe; (b) in a pre-lifting mode whereby the terrain underlying the lifting apparatus is compressed to a sufficient hardness so as to be able to apply a suitable reactive force to a force transmitting element of the lifting apparatus during the subsequent lifting mode; and (c) in a lifting mode when the lifting apparatus and the pipe being supported thereby are lifted.

Figure 1:
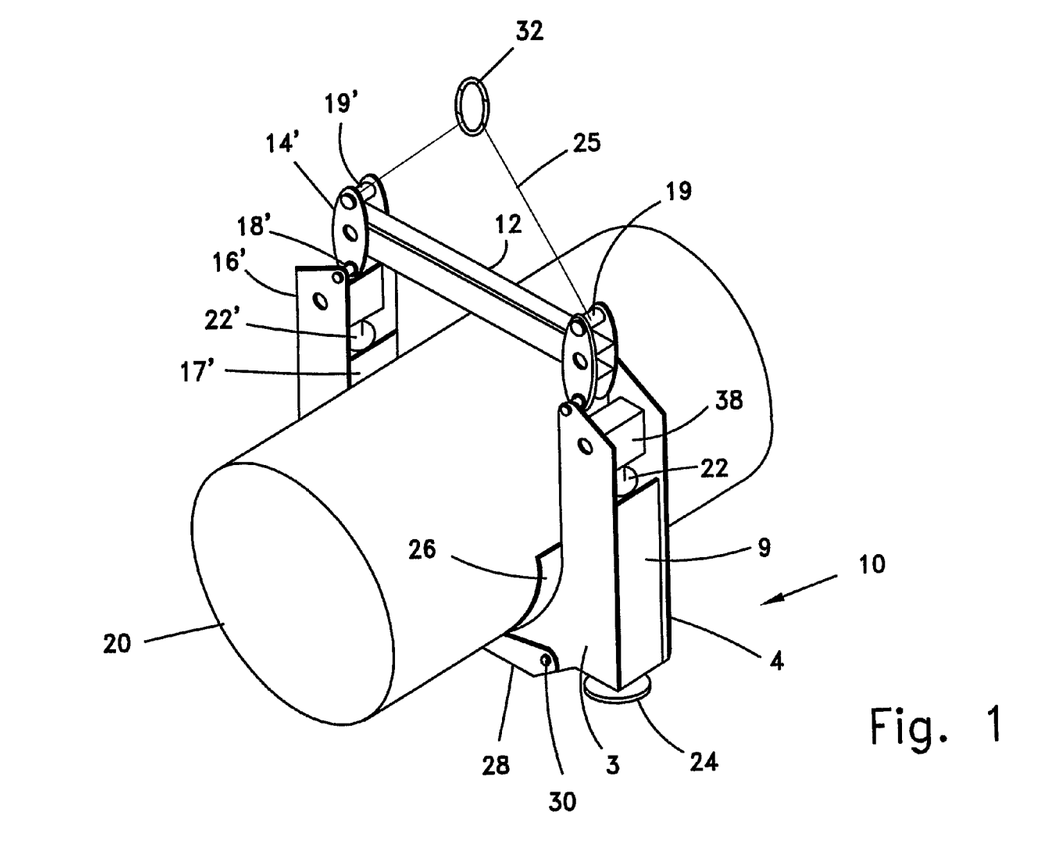
FIG. 1 is a perspective view of the lifting apparatus according to one embodiment of the invention in a pipe supporting position.
Figure 5:
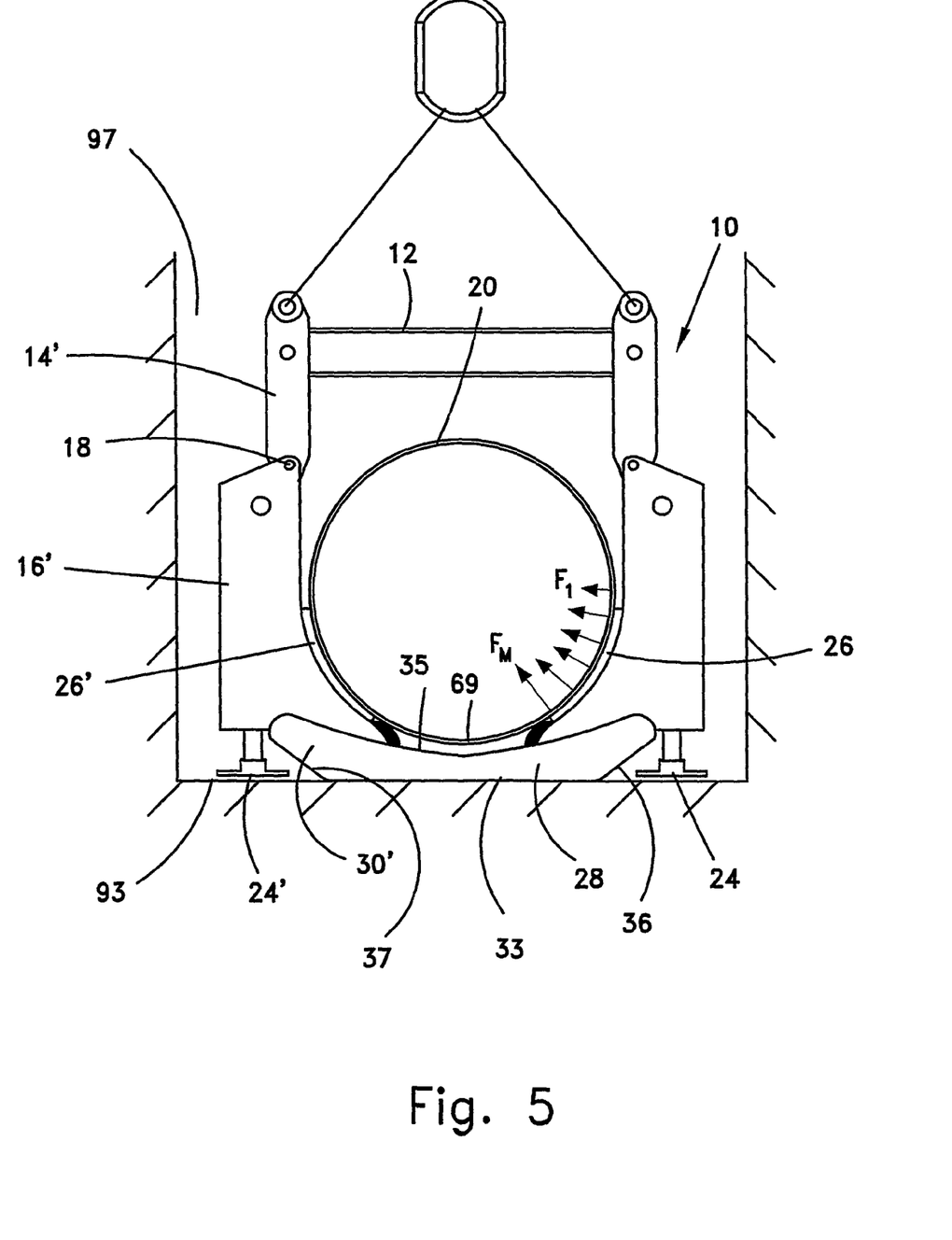

The lifting apparatus according to one embodiment of the present invention, which is indicated generally by numeral 10, is shown in a pipe supporting position in FIGS. 1 and 5. Lifting apparatus 10 comprises a lifting frame that consists of one horizontally disposed beam 12 positioned above pipe 20 and substantially orthogonally to the longitudinal axis of the pipe 20, and two significantly smaller vertically disposed beams 14 and 14' which are suitably connected to each end of the horizontal beam 12, respectively. Lifting apparatus 10 also comprises two oppositely disposed and symmetrical supporting members 16 and 16', between which pipe 20 is interposed. The upper ends of supporting members 16 and 16' are pivotally connected to the lower end of vertical beams 14 and 14', respectively, by means of pivots 18 and 18', respectively. The two supporting members 16 and 16' are linked together by means of front and rear connectors 28 (only one of which is shown) via a corresponding pair of pins 30 and 30' when lifting apparatus 10 is in a pipe supporting position, to prevent the supporting members from pivoting.

Supporting members 16 and 16' are configured to support the weight of pipe 20 in a continuously distributed manner. The following description refers to the configuration of supporting member 16, and it will be appreciated that the description is equally applicable to supporting member 16', albeit in a symmetrical fashion.

Figure 2:
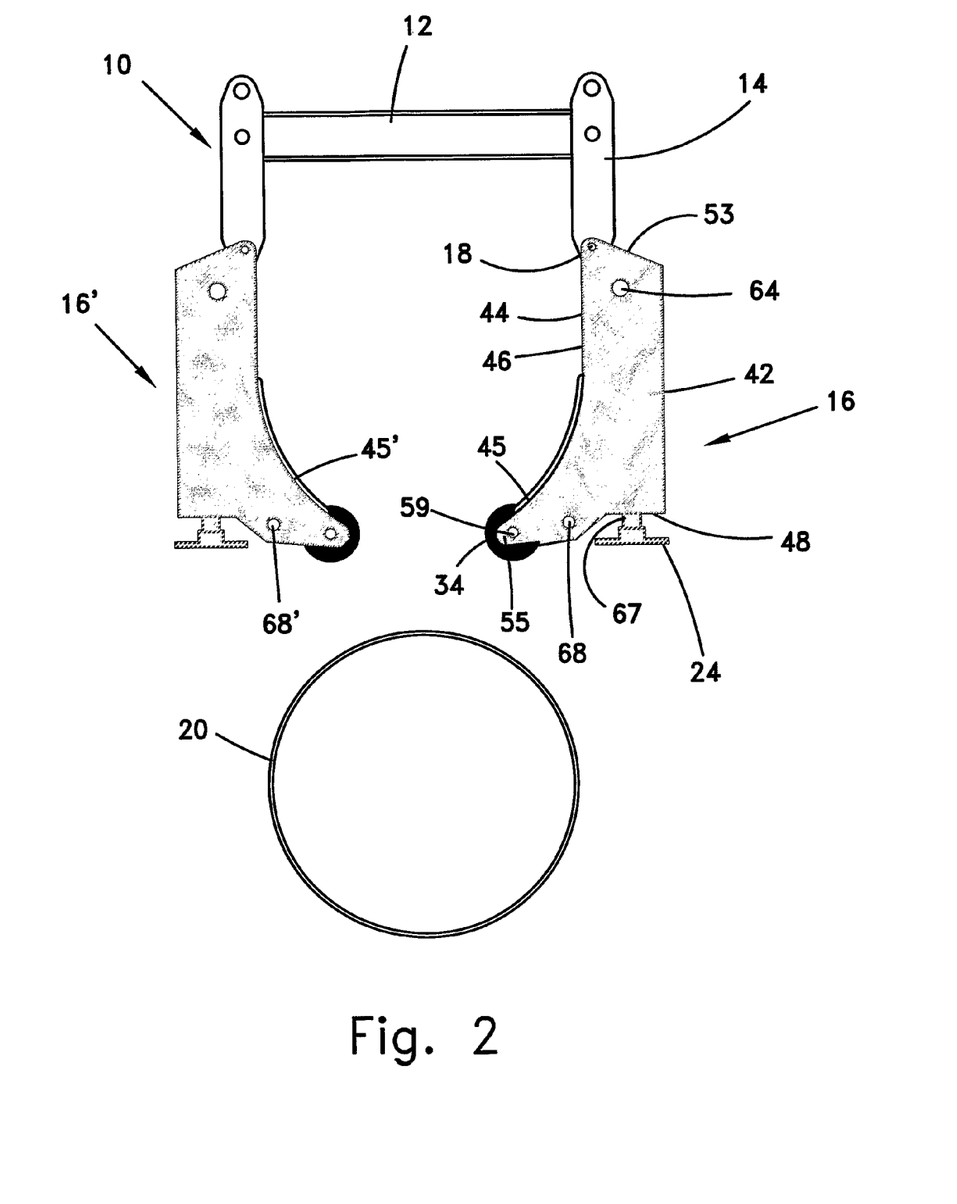
FIGS. 2-5 are front views of the lifting apparatus of FIG. 1, illustrating various stages of the process for lowering the lifting apparatus from above the pipe.

As shown in FIGS. 1 and 2, supporting member 16 comprises two identical, spaced plates 3 and 4, a pipe supporting surface 17 having an essentially similar profile as, and extending between the corresponding inner edge of, plates 3 and 4, and an outer plate 9. Plates 3 and 4 have a differently shaped outer edge 42 and inner edge 44, as well as a straight lower edge 48, a V-shaped lower edge, an upper edge 53, and an arcuate wheel guard 55. Outer edge 42 is straight, and is essentially vertical when supporting member 16 is in a pipe supporting position as shown in FIGS. 1 and 2. Inner edge 44 has a lower concave portion 45 and an upper straight portion 46 substantially parallel to outer edge 42. Concave portion 45 subtending an angle of approximately 65-75 degrees is tangential to straight portion 44. Straight lower edge 48 extends from, and is substantially perpendicular to, outer edge 42. Straight lower edge 48 is adjacent to V-shaped lower edge, which terminates with arcuate wheel guard 55. An aperture 68 is bored in the vicinity of V-shaped lower edge. Upper edge 53 is oblique with respect to outer edge 42 and upper straight portion 46 of the inner edge, in order to accommodate pivot 18 connecting supporting member 16 and vertically disposed beam 14. Since plates 3 and 4 are relatively narrow in the vicinity of upper straight portion 46 and are relatively wide in the vicinity of straight lower edge 48, a supporting member that is assembled from such plates has similar characteristics as an I-beam profile, which is extremely strong as well known to those skilled in the art. Therefore, supporting members 16 and 16' can be made from a suitable lightweight metal material without risk of structural failure.

Sheet of padding 26 is laid along, and affixed to, the pipe supporting surface 17 of supporting member 16, to reduce friction between pipe 20 and supporting member 16. Padding 26 also aids in creating a continuous distribution of normal forces along the surface of pipe 20. A guide wheel 34 is rotatably mounted within opposed wheel guards 55 of plates 3 and 4, respectively, by axle 59.

Concave portion 45 of inner edge 44 has a circular curvature, and its radius of curvature is essentially equal to that of pipe 20. When both supporting member 16 and 16' are in a pipe supporting position, corresponding concave portions 45 and 45', respectively, trace a continuous semicircle.

The lifting apparatus also comprises a driving unit for applying a linear force to the terrain underlying the lifting apparatus in the pre-lifting and lifting modes, as will be described hereinafter. In the following description, the driving unit is embodied by a hydraulic system, but it will be appreciated that any other suitable driving unit, such as a linear motor or a motor driven ballscrew, may be employed.

The hydraulic system comprises cylinder 22, in which a hydraulically actuated piston (not shown) is displaceable, housed in supporting member 16. Cylinder 22 is provided with a hydraulic inlet (not shown), to which a hydraulic pump (not shown) supplies hydraulic fluid in order to actuate the piston during the pre-lifting and lifting modes. Cylinder 22 is disposed such that its longitudinal axis is parallel to the outer edge of supporting members 16. The upper end of cylinder 22 is connected to block 38, which is fixedly attached to plates 3 and 4 by corresponding attachment elements 64. The piston of cylinder 22 is connected to foot 24 by rod 67.

Vertically beams 14 and 14' have horizontal rods 19 and 19', respectively with which tension supporting member 25, such as a cable or chain, for facilitating the lifting of pipe 20 is engaged. Tension supporting member 25 extends to a link 32, which is to be seized by a crane (not shown) for lifting the lifting apparatus 10 and positioning it appropriately. Such procedures are conventional and well known to one skilled in the art, and therefore need not be described in any further detail.

Figure 3:
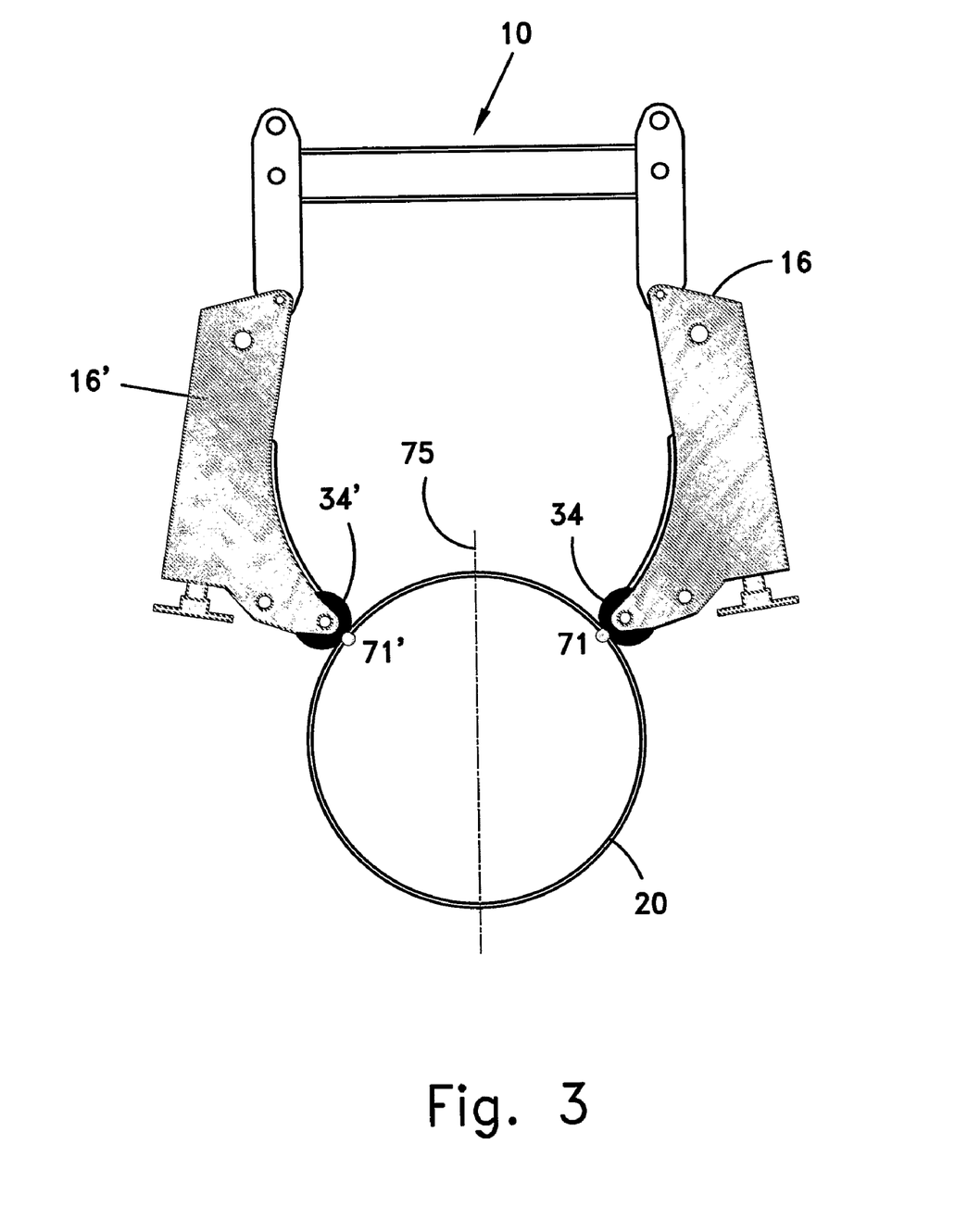
Figure 4:
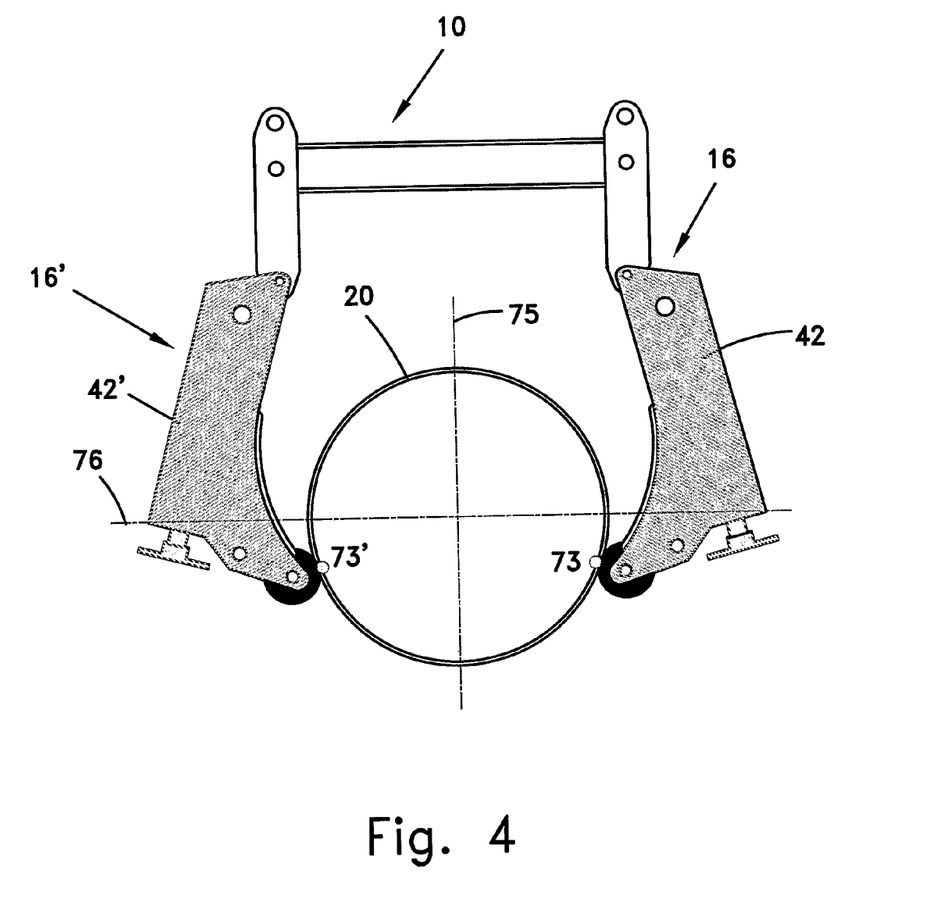

FIGS. 2-5 illustrate the operation of the lifting apparatus 10 during a lowering mode. As shown in FIG. 2, the apparatus 10 is first positioned above the pipe 20 such that the horizontal beam 12 lines up orthogonally with the longitudinal axis of pipe 20. As shown in FIG. 3, the apparatus 10 is lowered by force of a crane (not shown) until guide wheels 34 and 34' make initial contact with the periphery of the pipe 20 at contact points 71 and 71', respectively, on opposite sides of the vertical centerline 75 of pipe 20. During contact with the periphery of pipe 20, supporting members 16 and 16' outwardly pivot by means of pivots 18 and 18', respectively. As apparatus 10 is further lowered, supporting members 16 and 16' continue to outwardly pivot until guide wheels 34 and 34' contact the pipe periphery at the horizontal centerline of the pipe. As apparatus 10 is further lowered, as shown in FIG. 4, guide wheels 34 and 34' roll along the periphery of pipe 20 to e.g. contact points 73 and 73', respectively, below horizontal centerline 76 of pipe 20, resulting in the continuous inwardly pivoting of supporting members 16 and 16'. In the disposition of FIG. 4, the angle between outer edges 42 and 42' of supporting members 16 and 16', respectively, and vertical centerline 75 of pipe 20 is less than that of FIG. 3; however, the angle between outer edges 42 and 42' of supporting members 16 and 16', respectively, increases as the supporting members inwardly pivot. Lifting apparatus 10 is further lowered while guide wheels 34 and 34' roll along the periphery of pipe 20 until supporting members 16 and 16' are in a pipe supporting position, as shown in FIG. 5, such that the semicircle traced by concave portions 45 and 45' (FIG. 2) of supporting members 16 and 16', respectively, is concentric to pipe 20. Employment of guide wheels 34 and 34' during a lowering mode therefore advantageously provides self-positioning supporting members 16 and 16'.

If so desired, lifting apparatus 10 may be provided without guide wheels 34 and 34'. Accordingly, supporting members 16 and 16' may be pivoted manually, or by any other means well known to those skilled in the art, as lifting apparatus 10 is lowered to a pipe supporting position. Supporting members 16 and 16' achieve a pipe supporting position when the semicircle traced by concave portions 45 and 45' (FIG. 2) of supporting members 16 and 16', respectively, is concentric to pipe 20 and the two concave portions are sufficiently close to the periphery of pipe 20 to apply an inwardly directed radial force thereto.

Prior to fully lowering the apparatus 10, ground is removed from above and from the sides of pipe 20 to form trench 97. A small amount of the ground under the pipe is removed to form trench bed 93, by a depth and width that will allow the connectors 28 to be able to fit under the pipe 20.

Once supporting members 16 and 16' are in a pipe supporting position, connectors 28 are slid under the pipe 20 to join supporting members 16 and 16' together via a corresponding pair of pins 30 and 30'. As shown in FIG. 5, each connector 28 is narrow and elongated, extending between bores 68 and 68' (FIG. 2) of supporting members 16 and 16', respectively, in which pins 30 and 30', respectively, are inserted when the supporting members are in the pipe supporting position. Each connector 28 has a planar bottom edge 33, and is therefore able to stably contact trench bed 93 when joined with supporting members 16 and 16'. The top edge 35 of a connector 28 is slightly concave, to ensure that it will not contact pipe 20 if the connector 28 is flexed, and is lower than the concave portion of each plate inner edge. A connector 28 also has side edges 36 and 37.

FIG. 5 illustrates lifting apparatus 10 as pipe 20 is supported by supporting members 16 and 16', which are secured together by connectors 28 made of a lightweight yet rigid material. When supporting members 16 and 16' are in a pipe supporting position as shown, concave portions 45 and 45' (FIG. 2) apply an inwardly directed radial force to pipe 20. Due to the concave configuration of supporting members 16 and 16', the force applied to pipe 20 varies along the length of concave portions 45 and 45'. Each segment of concave portions 45 and 45' applies a force at an inward direction normal to the circumferential length of the corresponding segment, with the uppermost segment of concave portions 45 and 45' applying a minimal force of $F_1$ and the lowermost segment of concave portions 45 and 45' applying a maximal force of $F_M$. Since concave portions 45 and 45' subtend a limited angle of approximately 65-75 degrees, the bottommost portion 69 of pipe 20 is not in contact with the supporting members, and therefore cannot be deformed thereby. Nevertheless, pipe 20 is sufficiently supported by supporting members 16 and 16' as the pipe is lifted.

During the pre-lifting mode, the pistons are actuated until feet 24 and 24' of cylinders 22 and 22' (FIG. 1), respectively, contact the trench bed (not shown), astride the pipe 20. The axis of cylinders 22 and 22' are generally substantially vertical when supporting members 16 and 16' are in a pipe supporting position, and therefore remain substantially vertical during the pre-lifting mode. As the pistons continue to be actuated, feet 24 and 24' become correspondingly spaced from the bottom of cylinders 22 and 22', respectively, applying a greater force to the underlying terrain until the latter becomes compressed to such a degree that the feet become immobilized.

Since the weight of pipe 20 is entirely supported by supporting members 16 and 16', as well as by cylinders 22 and 22' when feet 24 and 24' are in contact with the trench bed, connectors 28 are generally not under stress as a result of the weight of pipe 20 and, as can be seen in FIG. 5, do not even make contact with pipe 20. Therefore, lifting apparatus 10 may be provided without any connectors 28; however, one or two connectors are preferably employed to prevent the pivoting of support members 16 and 16'.

The apparatus 10 is preferably balanced such that the weight of the pipe 20 is almost entirely carried by the supporting members 16 and 16', as well as by cylinders 22 and 22' during the pre-lifting mode, so that little or no force is exerted on the connectors 28. Hence, it is desirable that the portion of the trench bed that is situated on both sides of the pipe 20, on which the feet 24 and 24' rest, be substantially flat, and that the axis of cylinders 22 and 22' be disposed essentially vertically with respect to the vertical beams 14 and 14', respectively, thereby ensuring that no non-vertical forces are present. The lifting apparatus is nevertheless operable if the trench bed is sloped to a certain degree. Even if the terrain of the trench bed underlying one of the feet 24 and 24' were sloped, causing the corresponding cylinder to tilt and the corresponding supporting member to pivot without the influence of the connectors, supporting members 16 and 16' would remain in a pipe supporting position due to the influence of thin elongated connectors 28. The relatively rigid connectors 28 are of a fixed length, and although they undergo considerable stress when one of the feet is tilted, the distance between pins 30 and 30' by which the connectors are connected to the supporting members 16 and 16' does not change as a result of the substantially linear tensile or compressive force transmitted from the connectors to the supporting members. The direction of the force transmitted from the connectors to the supporting members is dependent on the direction of the angular displacement of the tilted cylinder foot.

Reliable and damage-free lifting of the pipe is contingent on the sufficient compression of the terrain underlying the lifting apparatus so as to apply a reactive force to the force transmitting element of the driving unit. The control unit schematically illustrated in FIG. 6 is used to verify that the terrain underlying the lifting apparatus is sufficiently compressed to allow commencement of the lifting mode.

Figure 6:
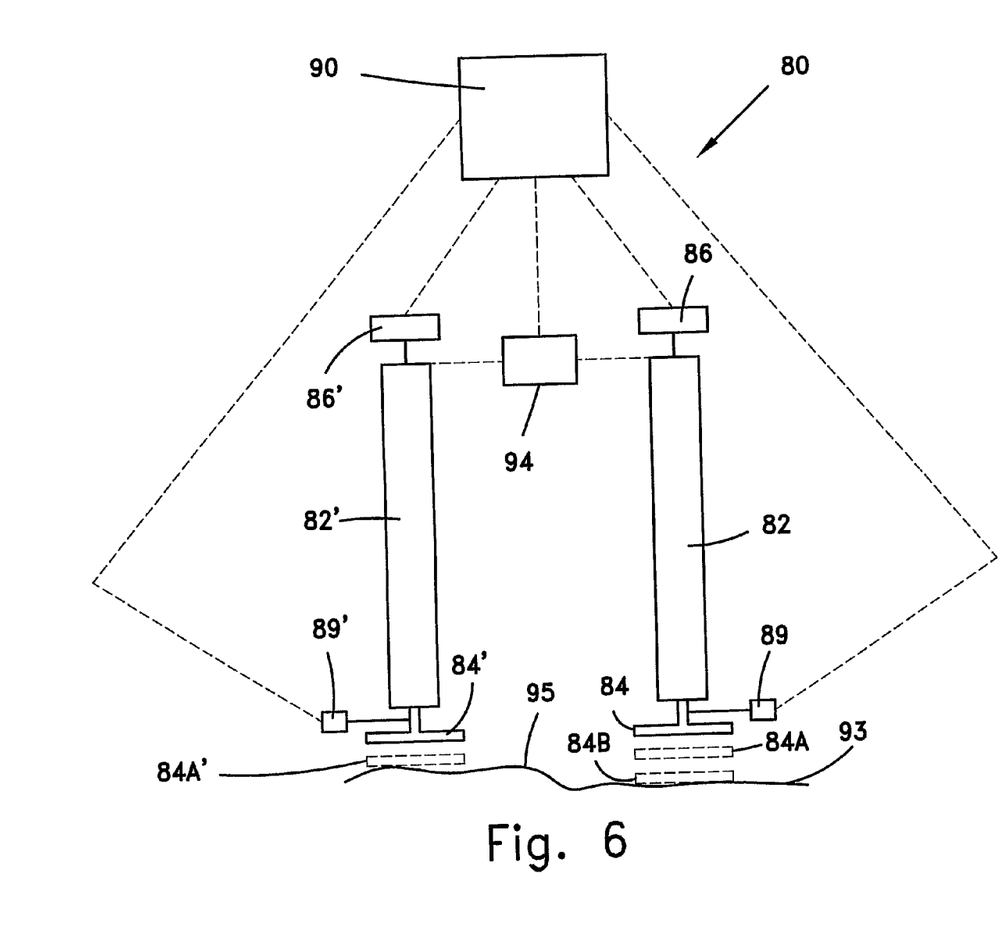
FIG. 6 is a schematic drawing of a control unit that is adapted to generate a driving force during the pre-lifting and lifting modes of the lifting apparatus.

As shown in FIG. 6, control unit 80 comprises two linear force driving units 82 and 82' housed in a corresponding supporting member, force transmitting elements 84 and 84' which are linearly extendable and retractable with respect to driving units 82 and 82', respectively, actuators 86 and 86' for independently driving units 82 and 82', respectively, sensors 89 and 89' for determining the axial displacement of force transmitting elements 84 and 84', respectively, with respect to the corresponding driving unit housing, and controller 90. Controller 90 is in electric communication with each actuator and axial displacement sensor, and is able to determine the magnitude of the force that is generated by each driving unit and the axial displacement of each transmitting element in response to the corresponding generated driving force.

At the conclusion of the lowering mode, the supporting members are in a pipe supporting position and the axis of the axis of each driving unit housing is in a vertical disposition. The force transmitting elements 84 and 84' are initially downwardly displaced during the pre-lifting mode by the same driving force, as sensed by actuators 86 and 86', and at the same rate, as determined by axial displacement sensors 89 and 89', towards trench bed 93. The illustrated trench bed 93 is substantially flat; however, it is formed with a step at region 95 such that the terrain underlying transmitting element 82 is below that of transmitting element 82'. Consequently, transmitting element 84', as represented by dashed lines 84A', will contact trench bed 93 before transmitting element 84, as represented by dashed lines 84A. Transmitting element 84 will continue to be downwardly displaced until achieving the position represented by dashed lines 84B in contact with trench bed 93.

Controller 90 determines that transmitting element 84' has contacted trench bed 93 by means of the reduction in its axial displacement. When transmitting element 84' encounters resistance by the underlying terrain, the rate of its axial displacement will sharply decrease while the generated driving force remains substantially equal. The rate of axial displacement decreases when the underlying terrain is being compressed, and transmitting element 84' has substantially no axial displacement when the underlying terrain is essentially completely compressed. When controller 90 determines that the underlying terrain is completely compressed, a command will be transmitted to actuator 86' to terminate operation of driving unit 82. Driving unit 82 will continue to operate until controller 90 determines that the terrain underlying transmitting element 84 is completely compressed. Consequently, the lifting mode will commence as transmitting element 84 is below transmitting element 84' and the terrain underlying transmitting elements 84 and 84' is completely compressed and is able to apply a reactive force.

Controller 90 may determine that the underlying terrain is completely compressed by other means well known to those skilled in the art, such as by use of a load cell installed on the transmitting elements.

Figure 7:
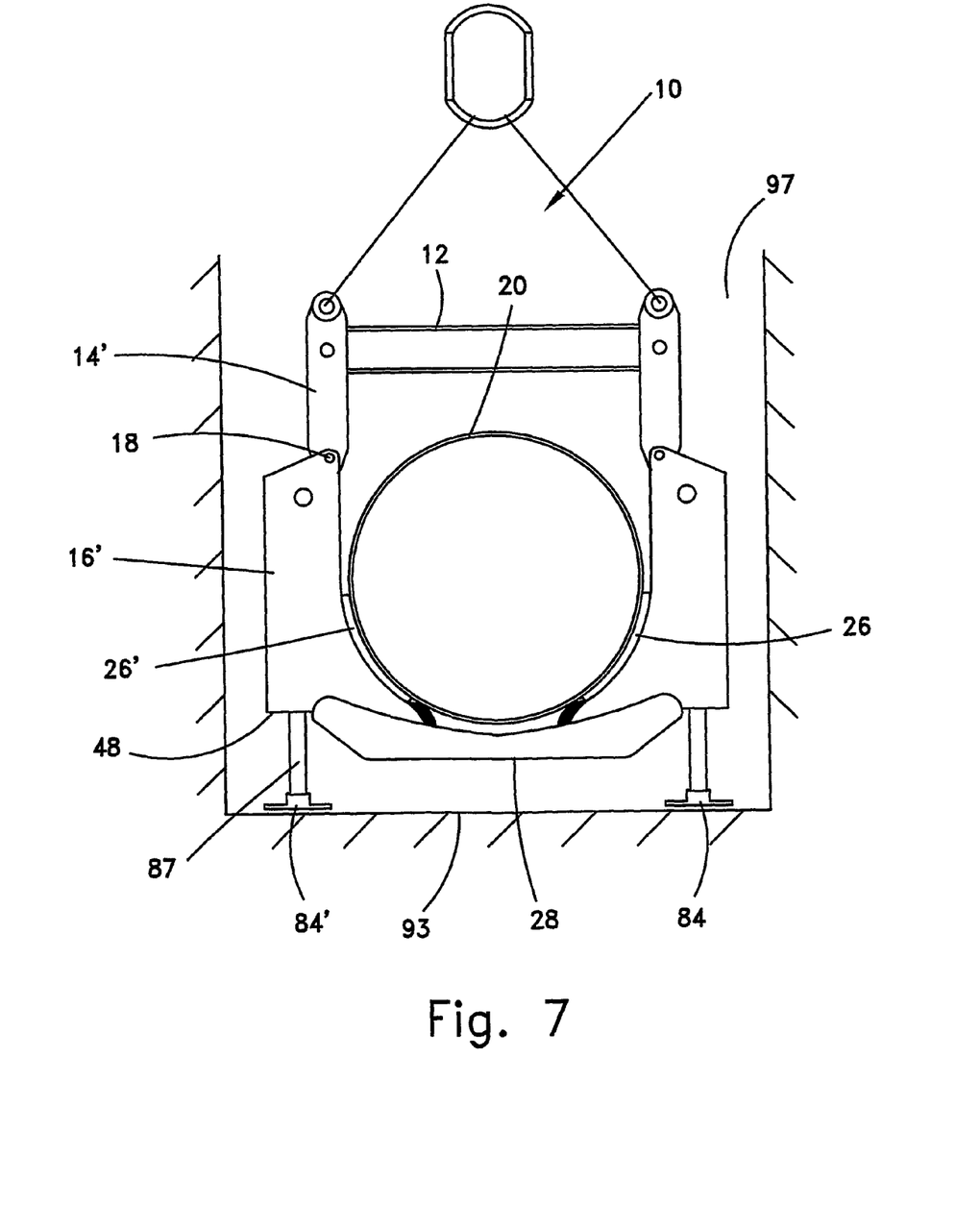
FIG. 7 is a front view of the lifting apparatus of FIG. 1, illustrating the displacement thereof during the lifting mode.

FIG. 7 illustrates lifting apparatus 10 in a lifting mode. Once the terrain underlying transmitting elements 84 and 84' is completely compressed and transmitting elements 84 and 84' are immobilized, controller 90 commands actuators 86 and 86' (FIG. 6) to generate a downwardly directed driving force significantly greater than the driving force that was generated during the pre-lifting mode and sufficient to lift pipe 20. Since the underlying terrain provides a sufficiently high reactive force, a downwardly directed driving force produces an upwardly directed reactant force applied to the corresponding driving unit housing. Consequently, the two driving unit housings are vertically lifted, together with the support members 16 and 16' connected thereto, respectively, at the same rate and by the same driving force even if the two transmitting elements are immobilized at different heights. The visible length of rods 87 and 87', which are connected to transmitting elements 84 and 84', respectively, and on which the driving unit housings, respectively, are slidingly displaceable, from straight lower edges 48 and 48' of supporting members 16 and 16', respectively, to transmitting elements 84 and 84', respectively, is therefore increased from FIG. 7 to FIG. 5 following the lifting of the supporting members.

Referring again to FIG. 6, control unit 80 may also comprise one or more orientation sensors 94 in communication with controller 90 for determining whether the lifting apparatus is balanced. One orientation sensor 94 may be mounted on horizontal beam 12 (FIG. 1) to determine whether the two supporting members kinematically connected to beam 12 are balanced. Alternatively, an orientation sensor 94 may be mounted on top of each driving unit housing, or at any other convenient location of each supporting member, to determine whether the two supporting members are in a mutual symmetrical disposition.

The determination of whether the lifting apparatus is balanced has benefit during each of the lowering, pre-lifting, and lifting modes. Firstly, the determination of the degree of symmetry of each driving unit housing has bearing on the ability of the lifting apparatus to reliably operate in the lifting mode. Transmitting elements 84 and 84' are generally able to flatten and compress uneven terrain as they are lowered during the pre-lifting mode. However, if the trench bed 94 is made of hard rock or other incompressible material such as concrete, the transmitting elements 84 and 84' would be forced to tilt. When the two transmitting elements tilt by a different angular displacement, connectors 28 become stressed in order to retain supporting members 16 and 16' in a pipe supporting position. If the two transmitting elements tilt by an angular difference greater than a predetermined value, connectors 28 may be excessively stressed, resulting in subsequent structural failure thereof which would reduce the safety of pipe 20 during the lifting mode. To prevent the excessive stressing of connectors 28, orientation sensors 94 may be used to indicate whether the angular difference of the two transmitting elements is greater than the predetermined value. When controller 90 determines that the angular difference of the two transmitting elements is greater than the predetermined value, actuators 86 and 86' are commanded to terminate the operation of the driving units, to prevent the lifting of pipe 20 and lifting apparatus with connectors 28.

The determination of whether the lifting apparatus is balanced also has importance in the lowering and pre-lifting modes. If the lifting apparatus were not completely balanced during the lowering mode, the supporting members would not achieve a pipe supporting position and the transmitting elements would invariably contact the trench bed at an angle during the pre-lifting mode.

Orientation sensors 94 may be used to ensure proper balance of lifting apparatus 10 during the lowering mode. If controller 90 determines that the lifting apparatus is not properly balanced, an alert, e.g. an audible alert or a visible alert, will be transmitted to the operator to adjust the disposition of the lifting apparatus. Alternatively, controller 90 may transmit a signal to the actuator of the crane (not shown) to automatically adjust the disposition of link 32 (FIG. 1) until lifting apparatus 10 achieves proper balance, as sensed by orientation sensors 94.

Orientation sensors 94 may be used to ensure proper balance of lifting apparatus 10 during the pre-lifting mode. While it is desirable that the longitudinal axis of each driving unit housing be substantially parallel to the outer edge of the corresponding supporting member and that each driving unit housing be loaded by essentially 50% of the pipe weight not transmitted to supporting members 16 and 16' when the transmitting elements 84 and 84' contact trench bed 93, the improper balance of the lifting apparatus would result in a different distribution of the pipe load onto the supporting members and in the tilting of the transmitting elements with respect to the trench bed. To balance lifting apparatus 10 in the pre-lifting mode, one of the transmitting elements is lowered onto the underlying terrain until it becomes immobilized while the second transmitting element is in contact with the underlying terrain without becoming immobilized. Controller 90 (FIG. 6) then regulates the driving force generated by the driving unit corresponding to the immobilized transmitting element so that the corresponding driving unit housing will be incrementally vertically displaced along the corresponding rod 87 or 87' (FIG. 7). Since the second transmitting element is not immobilized, the vertical displacement of only one driving unit housing will cause both supporting members 16 and 16' to pivot in such a way so that they will achieve the pipe supporting position.

A maintenance operation can be carried out on the periphery of pipe 20 following the completion of the lifting mode. To return pipe 20 to trench bed following the maintenance operation, the procedure is reversed. That is, during a lowering mode the downwardly directed driving force is reduced until the two driving unit housings, together with the corresponding supporting members 16 and 16', are lowered until connectors 28 are substantially in contact with trench bed 93. In a pre-raising mode, transmitting elements 84 and 84' are separated from trench bed 93. In a raising mode thereinafter, the supporting members 16 and 16' are suitably pivoted while apparatus 10 is raised by a crane (not shown) above pipe 20. Trench 97 is then filled with ground.

While only one embodiment of the invention has been described by way of illustration, it will be understood that the invention may be carried into practice with many modifications, variations and adaptations, without departing from its spirit or exceeding the scope of the claims.

The invention claimed is:

1. Apparatus for the lifting of pipelines, comprising:
   a. a frame having two vertical side beams and a transverse top beam interposed between said vertical beams;
   b. two concave and symmetrically disposed supporting members pivotally connected to said two vertical beams, respectively, and configured to achieve a pipe supporting position without applying a radial inwardly directed force to the bottommost portion of said pipe when said frame is suitably lowered and said supporting members are suitably pivoted;
   c. a driving unit disposed within, and fixedly attached to, each of said supporting members, for generating a linear downwardly directed force;
   d. a force transmitting element connected to a driving unit rod along which a corresponding driving unit housing is slidingly displaceable;
   e. a control unit for independently controlling each of said driving units; and
   f. at least one connecting means for releasably connecting said two supporting members to one another when said supporting members are in a pipe supporting position,
wherein said control unit is adapted to immobilize said force transmitting elements against a trench bed in a pre-lifting mode when a first force is generated by said driving units, and to lift each of said driving unit housings together with the corresponding supporting member with respect to the corresponding force transmitting element in a lifting mode when a suitable second force greater than said first force is generated by each of said driving units.

2. The apparatus according to claim 1, wherein each supporting member comprises two identical, spaced plates having an inner edge, a pipe supporting surface having an essentially similar profile as, and extending between the corresponding inner edge of, said plates, and an outer plate.

3. The apparatus according to claim 2, wherein each plate is formed with a planar outer edge, an inner edge having an upper planar portion substantially parallel to said outer edge, and a lower concave portion tangential to said upper planar portion by which the pipe is supported.

4. The apparatus according to claim 3, wherein the concave portion has a radius of curvature essentially equal to that of the pipe, a continuous semicircle being traced by the concave portion of each of the two supporting members being in a pipe supporting position.

5. The apparatus according to claim 4, wherein the concave portion subtends an angle of approximately 65 to 75 degrees.

6. The apparatus according to claim 3, wherein each plate is further formed with a lower edge of varying shape, a straight lower edge, and an upper edge.

7. The apparatus according to claim 6, wherein the upper edge is oblique with respect to the outer edge and the upper planar portion of the inner edge, a pivot connecting a supporting member and a corresponding vertical beam being engaged by an aperture formed in each plate in the vicinity of the upper edge.

8. The apparatus according to claim 3, wherein each plate is further formed with a wheel guard.

9. The apparatus according to claim 8, wherein the lower edge of varying shape is V-shaped, said V-shaped lower edge being interposed between said wheel guard and the straight lower edge, said straight lower edge extending from, and being substantially perpendicular to, the outer edge.

10. The apparatus according to claim 8, further comprising a guide wheel mounted within two opposed wheel guards of the two plates, respectively, of a corresponding supporting member.

11. The apparatus according to claim 10, wherein the two supporting members are self-positioning during the lowering mode.

12. The apparatus according to claim 11, wherein the supporting members are pivotable during the lowering mode once the two guide wheels contact a pipe periphery, on opposite sides of the pipe vertical centerline.

13. The apparatus according to claim 12, wherein the guide wheels are in continuous rolling contact with a pipe periphery from an initial contact point to a pipe supporting position.

14. The apparatus according to claim 12, wherein the supporting members are outwardly pivotable until the horizontal centerline of the pipe and are inwardly pivotable from the horizontal centerline of the pipe until the pipe supporting position.

15. The apparatus according to claim 2, wherein the pipe supporting surface is covered by an intermediate layer of padding.

16. The apparatus according to claim 1, wherein the control unit comprises means for determining that terrain underlying the force transmitting elements is sufficiently compressed during the pre-lifting mode to allow commencement of the lifting mode.

17. The apparatus according to claim 16, wherein the terrain compression determining means comprises:
   a. a controller;
   b. an actuator for each driving unit in communication with said controller by which the magnitude of the first and second forces generated by the corresponding driving unit is determinable; and
   c. a sensor in communication with said controller for detecting the axial displacement of each force transmitting element with respect to the corresponding driving unit housing,
said controller being adapted to determine that terrain underlying a force transmitting element is essentially completely compressed when the corresponding axial displacement sensor detects substantially no axial displacement of the corresponding force transmitting element during generation of the first force by the corresponding driving unit.

18. The apparatus according to claim 17, wherein the controller is adapted to transmit a command to an actuator to terminate operation of the corresponding driving unit when the terrain underlying the corresponding force transmitting element is essentially compressed.

19. The apparatus according to claim 18, wherein the controller is adapted to transmit a command to the actuator of each driving unit to generate the second force which is sufficient to produce an upwardly directed reactant force applied to the corresponding driving unit housing when the terrain underlying both force transmitting elements is essentially compressed, the two driving unit housings thereby being vertically lifted at the same rate.

20. The apparatus according to claim 17, wherein the control unit further comprises one or more orientation sensors in communication with the controller, for determining whether the lifting apparatus is balanced.

21. The apparatus according to claim 1, wherein each driving unit is a hydraulic system by which hydraulic fluid for actuating a piston displaceable within a cylinder housed within a corresponding supporting member is supplied during the pre-lifting and lifting modes.

22. The apparatus according to claim 1, wherein each vertical beam has a horizontal rod with which a tension supporting member extending to a link displaceable by means of a crane is engaged.

* * * * *